J. M. Flagg's,
Stamp-Moistener.

N° 73,708. Patented Jan. 28, 1868.

Witnesses:
Henry Barnard
P. E. Wilson

Inventor:
J. Melledge Flagg
by J. H. Adams
Atty.

United States Patent Office.

J. MELLEDGE FLAGG, OF PROVIDENCE, RHODE ISLAND.

Letters Patent No. 73,703, dated January 28, 1868.

---

IMPROVEMENT IN STAMP-MOISTENERS.

---

The Schedule referred to in these Letters Patent and making part of the same.

---

Be it known that I, J. MELLEDGE FLAGG, of Providence, in the county of Providence, and State of Rhode Island, have invented a new and improved Stamp and Finger-Moistener, of which the following is a full, clear, and exact description, reference being had to the accompanying drawings, making a part of this specification, in which—

The object of my invention is to provide a means for moistening revenue, postage-stamps, &c., previous to applying the same to letters, papers, &c., and also of moistening the fingers in counting bank-notes, in the place of wetting the same with the tongue; and the invention consists of an elastic reservoir containing water, and surmounted by a funnel-shaped top or cap, of metal or other suitable material, pierced with small holes in its bottom part, and having its upper part covered with flannel, or other equivalent absorbent substance, supported upon a convex piece of wire gauze, or its equivalent, attached to the upper part of the top or cap.

Figure 1:
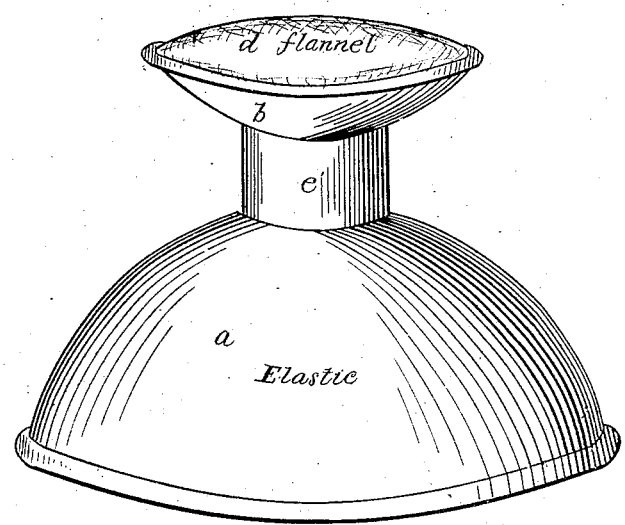
Figure 1 is a perspective view of my invention.
Figure 2:
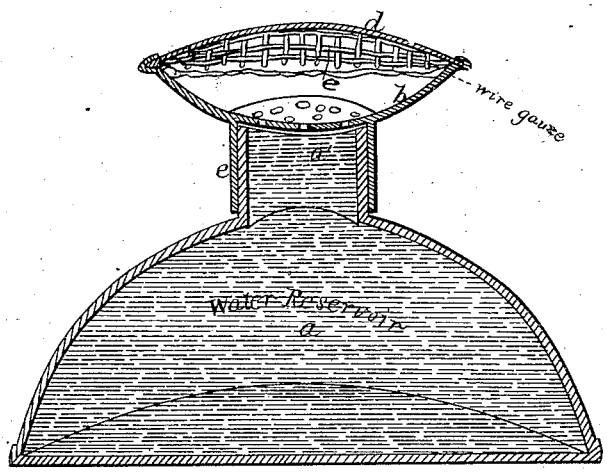
Figure 2 is a vertical section of the same, partially in perspective.

Referring to the drawings, $a$ represents a reservoir, of India rubber or other elastic material, formed preferably of the shape shown, so as to give it a firm support, and with a small cylindrical top, $a'$. $b$ represents a metallic cup, or dish-shaped top, formed with a cylindrical portion, $c$, which fits snugly on the top of the reservoir $a'$, as shown. The bottom of the cup $b$ is pierced with small holes, and on the top of the cup is fitted a frame, $c$, of wire gauze, or its equivalent, covered with flannel, cloth, or other equivalent absorbent material, $d$, the two being secured in the rim of the cap, as shown in fig. 2. The wire gauze serves as a frame or support for the flannel or absorbent material to keep the latter from being forced in when pressed upon by the fingers. The cup $b$ is removable, to allow the reservoir $a$ to be filled with water, cologne, or any desirable liquid.

By pressing upon the cap $b$ the liquid will be forced up, owing to the elasticity of the reservoir, through the perforated bottom of the cup $b$, against the flannel or other absorbent material, keeping the latter moist and ready for use.

The device is designed for use in banks, counting-rooms, post-offices, &c., for the purpose of moistening the fingers in counting out bank-bills, and in affixing stamps, thus doing away with the objectionable practice of using the tongue in moistening the fingers, stamps, &c. It can be made ready for use in an instant, and will remain so for a long time without replenishing. It can be made ornamental, and used also as a paper-weight. It is easily moved about without danger of upsetting, or of spilling the liquid even if upset.

What I claim as new, and desire to secure by Letters Patent, is—

The combination of the elastic reservoir $a$, the perforated cup or top $b$, the absorbent material $d$, and the wire-gauze support, substantially as and for the purpose specified.

In testimony whereof, I have signed my name to this specification in the presence of two subscribing witnesses.

J. MELLEDGE FLAGG.

Witnesses:
　J. H. ADAMS,
　M. S. G. WILDE.